C. W. Cahoon
Lamp
No. 2874
Reissued Feb. 25. 1868
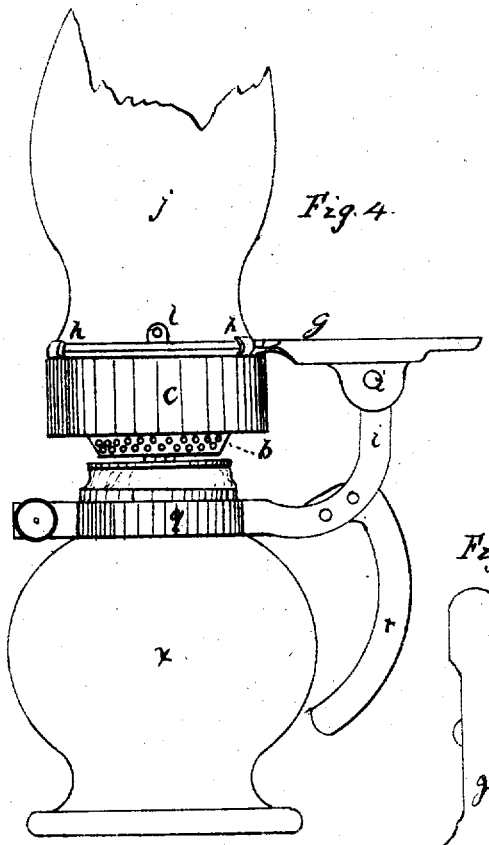
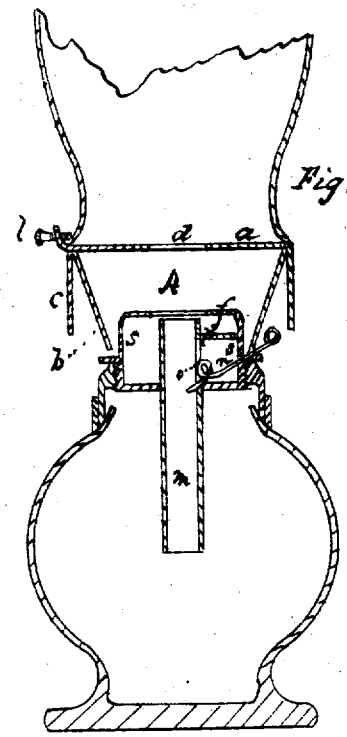
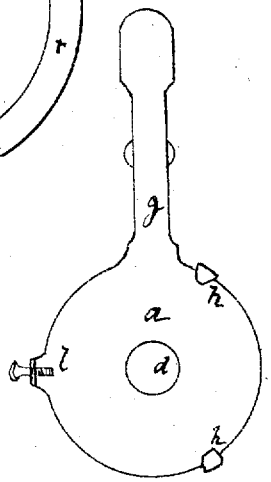
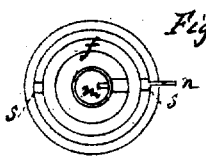
Witnesses.
Wm Henry Clifford
Henry C. Houston
Inventor.
Chas W. Cahoon

United States Patent Office.

CHARLES W. CAHOON, OF PORTLAND, MAINE.

*Letters Patent No.* 33,825, *dated December* 3, 1861; *reissue No.* 2,874, *dated February* 25, 1868.

IMPROVEMENT IN LAMPS.

The Schedule referred to in these Letters Patent and making part of the same.

TO ALL WHOM IT MAY CONCERN:

Be it known that I, CHARLES W. CAHOON, of Portland, in the county of Cumberland, and State of Maine, have invented certain new and useful Improvements in Lamps; and I hereby declare the following to be a full, clear, and exact description thereof, which will enable others to make and use my invention, reference being had to the accompanying drawings, forming part of this specification, in which—

Figure 1 shows a top view of the lever and the deflector.

Figure 2, a vertical section of the lamp.

Figure 3 shows a top view of the lamp-top.

Figure 4, a side elevation of the lamp.

This invention consists in improvements upon the lamp for which Letters Patent were granted to me, February 19, 1861, and has an air-chamber, formed of a piece of perforated metal surrounding the wick-tube, a broad, flat deflector, or one nearly so, having a hole in the centre thereof, through which the flame of the lamp issues; and also of an air-screen, to protect the flame of the lamp from side currents of air, as well as to insure the admission of the necessary current of air from below the flame. It also consists in the form of a lever for raising the chimney, and in uniting the said deflector and lever, in order that the chimney may be raised or thrown back together with the said deflector.

My invention also consists in attaching the air-chamber to the lever, so that the air-chamber will be moved with the lever for the sake of convenience in lighting the lamp, and of lighting other lamps therefrom. Still further, it consists in placing a ring of sheet metal just above the top of the wick-tube, so as, in some degree, to prevent the flame from smoking when the air-chamber or air-screen is removed therefrom, and also to effect a more nearly perfect combustion when the air-screen is in its place around the flame, or, in other words, when the air-chamber is not removed.

My invention also consists of a method of raising a round, solid wick, when a lamp with a lever for lifting the chimney is used. It also consists in an arrangement for connecting with the lever of the lamp a handle, so that in case of fracture of the lower part or body of the lamp, the lever and lamp-top, or whatever is thereto attached, can be transferred at once to another lamp.

A shows the air-chamber of the lamp, being formed, as before specified, of the deflector *a*, perforated conical piece of metal, *b*, and cylindrical tubular air-screen, *c*. The deflector is made broad, flat, or nearly so, and has in its centre the hole *d*, for the emission of the flame. The object of this deflector is, that the air entering the chamber A may be brought in contact with a highly-heated surface, in some measure, in order that becoming itself heated, it will produce a more perfect combustion than in the case of steep conical deflectors. *c* is the cylindrical tubular air-screen, surrounding the perforated piece of metal, so that the air through the said perforated piece of metal is admitted from below, and so rises around the flame, being thus subject to the influences of the heat, as before set forth. This air-screen forms the sides or walls of the air-chamber A. The sheet-metal ring *f*, that surrounds the wick-tube slightly above the same, as before specified, is supported by two standards, *s s*. It is made a little larger than the tube, as shown in the drawings. This ring subserves two purposes: first, it improves the character of the flame of the lamp, when the chamber is placed over the flame, or, in other words, when the air-screen is around the wick-tube and flame, by securing a more thorough combustion, and steadying the flame; and, second, when the air-screen is removed from around the flame, it steadies the flame, in a degree prevents it from smoking, and measurably guards it or renders it less likely to be influenced by side currents of air, to which it is liable when the air-screen is thus removed. It will be understood, of course, that this ring *f*, when made separate from the deflector *a*, remains in its position a little above the top of the wick-tube, when the air-screen is removed. When the air-screen is in its place around the wick-tube and flame, both it and the ring *f* serve to improve the quality of the flame, being employed, each as auxiliary to the other, for this purpose.

For the sake of convenience in removing the chimney from over the wick-tube, I attach to the chimney-holder, having the deflector, &c., a lever, or projection. *g* is the lever or projection, connected with the chimney-holder *h*, for the purpose of raising the chimney, as before specified, and is pivoted to the fulcrum *i*. *j* shows the chimney, which is held in position by being connected with the deflector, and is removable therefrom. *h* shows the chimney-holder, having the deflector *a* and chimney-fastenings *l*. Both the screen and deflector are connected with the lever *g*, and may be secured either by soldering or by means of thin strips of sheet metal made in the form of hooks, which may be riveted to them, allowing the hooks to go over the top of the lever, or thin sheets of metal or pieces of wire may connect the screen and perforated piece of metal, and be then bent over the lever. *m* shows the wick-tube, which is round. *n* is a bar, for moving the wick. It has a stop, *o*, near that end of it which goes into the wick. *p* is a cap, which encloses that part of the bar *n* on which is the stop, and which holds the bar, by means of the stop, in close proximity to the wick, but yet allows it to be moved into or out of the wick. This cap is attached by means of solder partly to the wick-tube, serving to cover the slot through which the bar *n* enters the wick, and partly to the lamp-top, having a hole in its outer side for the bar *n* to move in, which is too small for the stop on the bar to be got out of. The bar *n* is made of wire, and the stop *o* is formed by making a short turn or loop in the wire, so that its two shanks will be longitudinally opposite. *q* is a collar to the fulcrum, so made as to fit the collar of the lamp, and is connected with the lever, being held together by a rivet or pin. *u* is a piece of metal, attached to the fulcrum, and curved downwards therefrom, being intended to serve as a handle to the lamp. *x* is the body of the lamp, which is of glass.

What I claim as my invention, and desire to secure by Letters Patent, is—

1. A lever, with chimney-fastenings, having that part of it on which the chimney rests extended, so as to form a deflector, substantially as described.

2. The deflector, broad, flat-shaped, or nearly so, when filling the interior of the chimney, and combined with an air-screen and ring with standards, substantially as and for the purposes specified.

3. The combination of the said deflector with the conical foraminous piece of metal and the cylindrical tubular air-screen, for the purpose of forming the air-chamber A, protecting the flame, and admitting the air from below the same, substantially as described.

4. The combination, with the lever for raising the chimney, of the deflector, air-screen, and foraminous piece of metal, substantially as and for the purposes specified.

5. The ring, surrounding the wick-tube, a little above the top of the same, with the standards *s s*, substantially as and for the purposes specified.

6. A chimney-holder, having a projection for manipulating the same, chimney-fastenings, a deflector, and a joint, substantially as and for the purposes set forth.

7. The combination of the ring *f*, supports *s s*, and air-screen *c*, substantially as and for the purpose set forth.

8. In combination with the burner of a lamp having a glass body, a metallic handle, as herein described.

CHAS. W. CAHOON.

Witnesses:

WILLIAM H. CLIFFORD.
HENRY C. HOUSTON.